April 12, 1960 D. W. FATH ET AL 2,932,414
GRAPHIC SIGNALING AND INDICATING CONTROL SYSTEM
Filed March 10, 1958 8 Sheets-Sheet 1

Inventors
Douglas W. Fath
Charles E. Smith
By Wm. A. Autio
Attorney

April 12, 1960 D. W. FATH ET AL 2,932,414
GRAPHIC SIGNALING AND INDICATING CONTROL SYSTEM
Filed March 10, 1958 8 Sheets—Sheet 3

April 12, 1960 D. W. FATH ET AL 2,932,414
GRAPHIC SIGNALING AND INDICATING CONTROL SYSTEM
Filed March 10, 1958 8 Sheets-Sheet 7

Fig. 8

Inventors
Douglas W. Fath
Charles E. Smith
By Wm. A. Autio
Attorney

Fig. 9

# United States Patent Office 2,932,414
Patented Apr. 12, 1960

2,932,414

GRAPHIC SIGNALING AND INDICATING CONTROL SYSTEM

Douglas W. Fath, Brookfield, and Charles E. Smith, Milwaukee, Wis., assignors to Cutler-Hammer, Inc., Milwaukee, Wis., a corporation of Delaware Application March 10, 1958, Serial No. 720,398

19 Claims. (Cl. 214—18)

This invention relates to graphic signaling and indicating control systems.

While not limited thereto, the invention is especially applicable to charging program control systems for blast furnaces and the like for graphic representation of a plurality of furnace operations and for indication of a variable plurality of synchronized and cyclical control operations the sequence of which may be selectively predetermined.

In the processing of ore in a blast furnace, it is the usual practice to employ a skip hoist mechanism for charging the furnace. The usual skip hoist mechanism of this type comprises a pair of inclined tracks extending between a skip charging pit at the base of the furnace and a distributor hopper at the top of the furnace, and a pair of skip cars traveling on these tracks for conveying charging material from the pit and dumping the same into the distributor hopper. The skip cars are connected together through their operating mechanisms in counterbalancing relation and arranged so that when one skip car is traveling upwardly along its track toward the top of the furnace the other skip car is traveling downwardly along its track toward the charging pit. Each time the left skip car enters the charging pit, the right skip car enters its dump position at the top of the furnace and vice versa. At such times, the skip hoist is stopped for a predetermined time interval to permit dumping of a skip load into the distributor hopper and to permit filling of the other skip car from either a weigh hopper or scale car over the charging pit. The skip hoist is then restarted in the reverse direction to hoist another load.

The weigh hopper located over the charging pit and the scale car which may be moved on tracks thereover are provided with discharge gates operable for discharging quantities of selected charging materials such as ore, stone and coke into the left and right skip cars when the latter enter the charging pit. While coke may be automatically discharged from storage bins into the weigh hoppers and from the latter into the skip cars, movement of the scale car into position over the pit and discharge of ore and stone therefrom into the skip cars is under the control of a scale car operator.

As is well-known in the art, the blast furnace is provided with a rotatable upper receptacle known as a distributor hopper closed at its lower portion by a small bell, and a lower receptacle closed at its lower portion by a large bell, the latter closing the space between the bells from the interior of the furnace. Following the deposit of each skip load of charging material on the small bell in the distributor hopper, the latter is rotated a preselected angular amount under the control of a hopper limit switch whereafter the small bell is lowered to discharge the material onto the large bell. When a preselected number of loads have been accumulated on the large bell in a desired distribution, the latter is lowered to drop the charge into the furnace.

Also in the manner well-known in the art, a high pressure top blast furnace is provided with a relief valve for connecting, when opened, the space between the bells to the atmosphere thereby to depressurize the furnace top to facilitate opening of the small bell; and an equalizer valve for connecting, when opened, the space between the bells to the interior of the furnace thereby to pressurize the furnace top to facilitate opening of the large bell. The relief and equalizer valve operators are interlocked to one another and to the small bell and large bell operators to permit opening of the small bell only when the large bell and equalizer valve are closed and the relief valve is open, to permit opening of the large bell only when the small bell and relief valve are closed and the equalizer valve is open, and to permit opening of one of the valves only when the other valve is closed.

Left and right vertically operable stockrods are provided for measuring the depth of the charge in the furnace. The stockrods are automatically hoisted before the large bell is opened and are automatically lowered after the large bell is closed.

A charging sequence preselection and automatic program control system has been provided to afford preselection of coke, stone and ore for a plural load charging sequence and recycling program and to afford synchronized program control of the distributor angle, the skip hoist, the small bell and the large bell. There has also been provided a load summary program control for controlling the charging sequence as preselected. For a disclosure of the aforementioned charging sequence preselection and program control system, reference may be had to Douglas W. Fath and Charles E. Smith copending application Serial No. 720,400, filed March 10, 1958.

The sequence in which the iron ore, stone and coke are to be charged into the furnace is preselected on selector switches on the hoisthouse program selector panel by the furnace superintendent or "blower" having charge of the over-all operation of the furnace. Selector switches are also provided for preselecting a water charge, a distributor angle change and a large bell dump in any desired order or for any desired load of the charging sequence. In the operation of the furnace, a scale car operator having his station in the stockhouse controls certain operations relative to loading of the skip cars.

In order to eliminate or to decrease significantly the probability of human error, to properly coordinate the various functions and operations, to facilitate the correction of unstandard conditions and faults and thereby increase the charging capacity of the system, it has been found desirable to provide apparatus for signaling and indicating to the superintendent in the hoisthouse as well as the scale car operator in the stockhouse the various preselected conditions and furnace operations as they occur. Since the control system operates automatically to a large extent it has also been found desirable to provide apparatus in the hoisthouse for indicating the various program control functions as they occur thereby to keep the superintendent informed of the exact functional step that is being performed at any given moment. To this end, it has been found desirable to provide visual indicators affording the viewer a true graphic picture of the operating furnace as well as operational flow signals for indicating internal functions of the program control system.

Accordingly, an object of the invention is to provide improved means affording the aforementioned and other results.

A more specific object of the invention is to provide improved graphic signaling and indicating means affording a true graphic indication of machine operation.

Another specific object of the invention is to provide improved means for indicating a preselected charging sequence and for indicating the step of such sequence occurring at any given instant.

Another specific object of the invention is to provide improved means for graphically indicating in a plurality of steps operation of a skip hoist throughout its operating cycle.

Another specific object of the invention is to provide improved signaling and graphic indicating means having exhibiting elements arranged according to and likened to the operating elements of a blast furnace.

Another specific object of the invention is to provide improved means for indicating the operating steps of a plurality of program control devices in accordance with their sequence of operation and arranged so as to readily indicate the extent of progress of a blast furnace charging control system.

Other objects and advantages of the invention will hereinafter appear.

While the apparatus hereinafter described is effectively adapted to fulfill the objects stated, it is to be understood that we do not intend to confine our invention to the particular preferred embodiments of indicating systems disclosed, inasmuch as they are susceptible of various modifications without departing from the scope of the appended claims.

The apparatus hereinafter described is adapted for preselection and indication of a plural skip load charging program. The desired charging program is preset on a plurality of groups of selector switches on a program selector panel located in the hoisthouse of the blast furnace, there being one selector switch in each group for for each load of the charging cycle, and the number of selector switches in each group corresponding to the maximum number of skip loads presettable for each charging cycle. The charging control system is arranged to charge the number of skip loads preset on the selector switches and then recycle whereafter the preset charging sequence is repeated.

Figure 1:
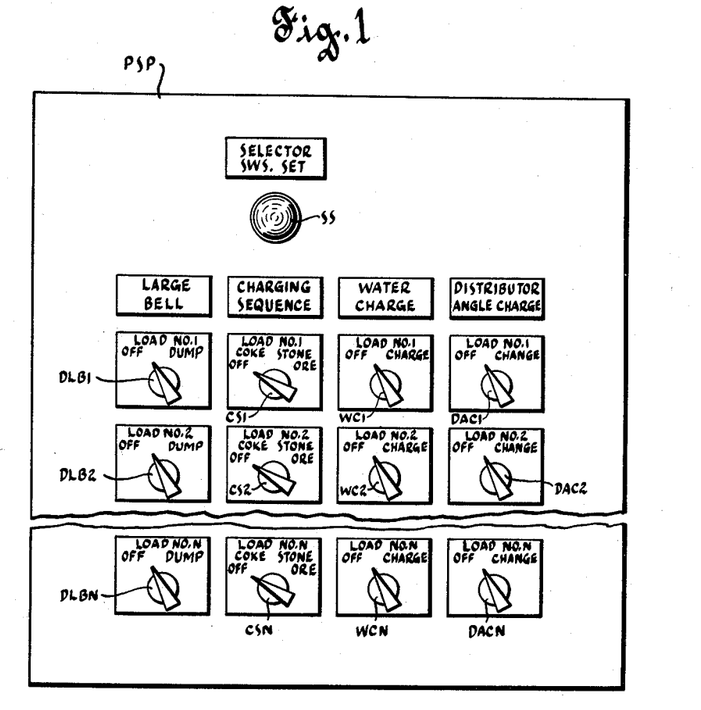
Figure 1 shows a front view of a charging program selector panel.

To this end, as shown in Fig. 1, there is provided a hoisthouse program selector panel PSP having four vertical columns or groups of selector switches marked large bell, charging sequence, water charge and distributor angle change. Each column is provided with the same number of selector switches, the respective selector switches in each column being arranged in horizontal rows. The four selector switches in each row control the four optional operations which may be preset to take place on each load of the charging sequence. Any desired number of selector switches may be provided in each column, as indicated by the broken panel, depending on the number of skip loads required for the charging sequence.

Each large bell selector switch DLB1, DLB2-DLBN in the left-hand column is provided with an Off position and a Dump operating position for preselection of a large bell dump at any desired point in the charging cycle and as often as desired during the charging cycle. When the large bell selector switch for a given load is set in its Dump position, the large bell will automatically dump after such given load has been deposited on the large bell. Thus, if the large bell selector switch for load No. 2 has been preset in its Dump position, the large bell will dump after load No. 3 has been dispatched from the stockhouse, load No. 2 at this time having been deposited on the large bell.

Each charging sequence selector switch CS1, CS2-CSN in the second column from the left is provided with an Off position and Coke, Stone and Ore designating operating positions for preselection of one of these charging materials for each load of the charging cycle.

The large bell and charging sequence selector switches are also provided with contact sets affording signal indications hereinafter described in connection with Fig. 4.

Each water charge selector switch WC1, WC2-WCN is provided with an Off position and a Charge designating operating position for preselection of a water charge for any given load of the charging cycle. As a quantity of water may be added automatically to any given skip load along with the charging material in accordance with the setting of the water charge selector switches, indication of the water charge is not required.

Each distributor angle change selector switch DAC1, DAC2-DACN is provided with an Off position and a Change designating operating position for preselection of a distributor angle change, e.g., a predetermined increase in the angle to which the distributor is rotated thereafter each time a skip load is dumped on the small bell. When the distributor angle change selector switch for a given load is set in its Change position, the rotation angle will be advanced after such given load has been rotated.

Program selector panel PSP is also provided with a lamp SS for energization when the charging sequence selector switches are set correctly as hereinafter described.

Figures 2, 2A:
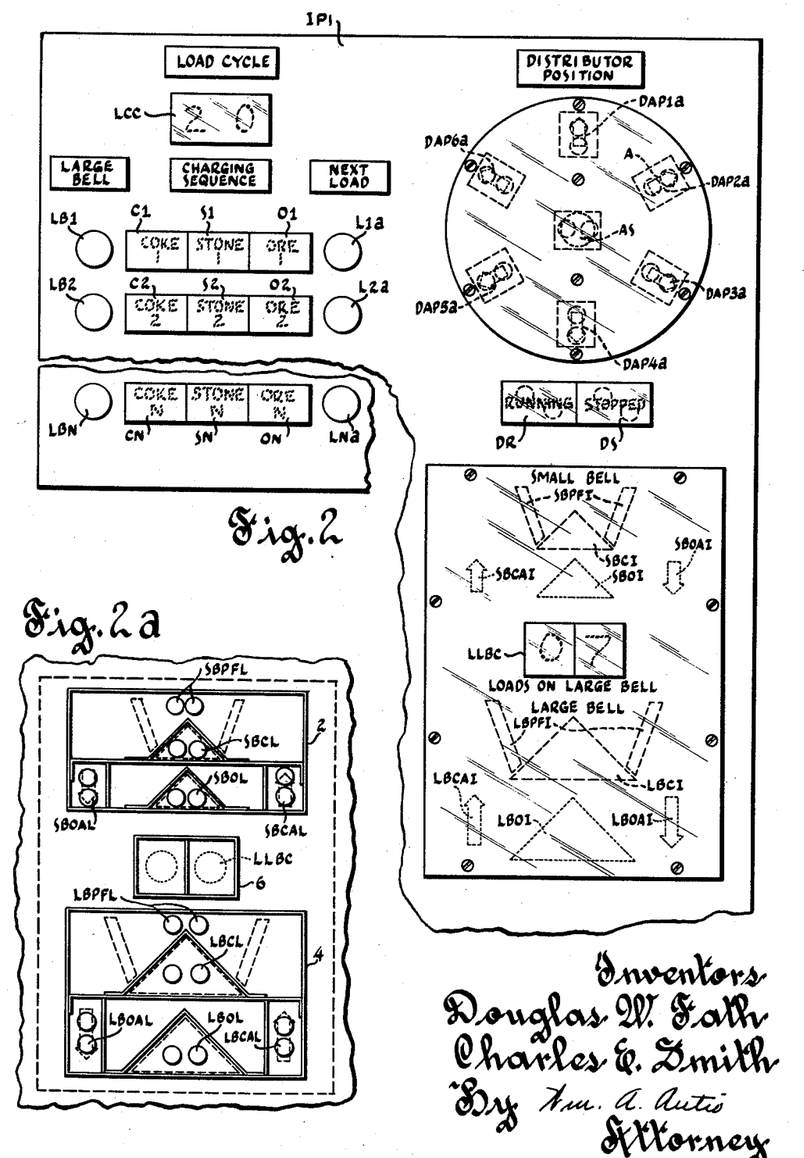
Fig. 2 shows a front view of an indicator panel having preselected charging program indicators and graphic signaling indicators representing blast furnace elements.
Fig. 2a is a back view of the lower right-hand portion of the panel of Fig. 2.

Referring to Fig. 2, there is shown a graphic indicator panel IP1 located in the hoisthouse. A similar indicator panel is provided also in the stockhouse of the blast furnace for giving the scale car operator a graphic indication of furnace operation as well as the preselected charging program and the progress of the latter.

Panel IP1 is provided at its upper left-hand portion with a load cycle counter LCC for indicating the total number of times a complete charging cycle, as preset on the program selector panel of Fig. 1, has been charged. It is necessary that the scale car operator be advised of the cycle being charged in order to determine the type of ore to be loaded in the skip car. The scale car indicator panel in the stockhouse, hereinafter described, indicates the charging sequence in terms of coke, stone and ore. Therefore, since there are several types of ore, such as Peruvian, sinter and mixed, for example, and different types of ore may be charged in the different sequential cycles of the charging sequence, indication of the cycle being charged is provided.

Panel IP1 is also provided at its left-hand portion with vertical columns or groups of visual indicators marked large bell, charging sequence and next load. The large bell and charging sequence indicators correspond to the large bell and charging sequence selector switches of Fig. 1 and indicate the setting of these selector switches. The large bell indicators comprise a plurality of lamps LB1, LB2–LBN equal to the maximum number of loads in a charging cycle. The charging sequence indicators comprise a plurality of sets 1, 2–N of indicators equal to the maximum number of loads in the charging cycle, each set comprising coke, stone and ore indicators C1, S1, O1; C2, S2, O2 to CN, SN, ON; and the indicators of each set being arranged in a horizontal row with the large bell lamp corresponding to the respective charging load. At the right-hand side of the large bell and charging sequence indicators is provided a vertical column of next load indicators respectively aligned with the horizontal rows of the former for indicating the progress of the charging cycle, e.g., the next load to be charged.

The right-hand portion of panel IP1 is provided with graphic signaling indicators comprising exhibitors arranged so as to indicate the true physical relation and operation of the blast furnace elements represented thereby. The blast furnace is normally provided at its uppermost portion with a rotary distributor hopper or upper receptacle into which each skip load is dumped whereafter the distributor rotates to preset angles to afford the charging materials a desired distribution in the furnace. Therefore, panel IP1 is provided with a circular distributor position indicator, so marked on a name plate, and comprising an accurate stop lamp AS at the center and arranged therearound at 60 degree angles in a clockwise direction rotation angle indicators DAP1a (0°), DAP2a (60°), DAP3a (120°), DAP4a (180°), DAP5a (240°) and DAP6a (300°). Directly below the distributor position indicator, there are provided in horizontal arrangement a distributor running indicator DR and a distributor stopped indicator DS. The distributor position indicators are constructed and arranged to illuminate an arrow A or the like on the indicator panel at the preselected distributor rotation angle. The pairs of lamps and lamp enclosures shown in broken lines and mounted on the back of the panel may be constructed and arranged in the manner shown and described in Douglas W. Fath and Charles E. Smith copending application Serial No. 720,403, filed March 10, 1958.

The aforementioned blast furnace is provided with a small bell for normally closing the lower portion of the distributor hopper and operable to drop each skip load deposited thereon, and after rotation of the hopper, into a lower receptacle. The lower receptacle is normally closed at its lower portion by a large bell, the latter being operable to drop a plurality of skip loads accumulated thereon into the furnace. The blast furnace charging controller is provided with loads on large bell counter operable to register a count each time the small bell is lowered to drop a skip load onto the large bell.

To graphically indicate the aforementioned furnace elements and their operating conditions, there is provided on panel IP1 directly below the distributor position and condition indicators a pair of small bell position fixed indicators SBPFI diverging upwardly and representing the upper receptacle. The lower ends of indicators SBPFI are bridged by a generally bell-shaped small bell closed indicator SBCI. Spaced downwardly from indicator SBCI is a generally bell-shaped small bell open indicator SBOI. On the right-hand side of the small bell open indicator there is provided a downwardly-directed small bell opening arrow indicator SBOAI and on the left-hand side thereof an upwardly-directed small bell closing arrow indicator SBCAI.

Directly below the small bell open indicator SBOI there is provided loads on large bell indicator LLBC for numerically registering each opening cycle of the small bell. The loads on large bell indicator LLBC and the load cycle indicator LCC hereinbefore described may be of a well-known neon tube type or the like for visually indicating the numerical count registered thereon.

The large bell indicators located directly below the loads on large bell indicator are generally similar to the small bell indicators hereinbefore described but of larger dimensions. Thus, a pair of upwardly-diverging large bell position fixed indicators LBPFI are bridged at their lower ends by a bell-shaped large bell closed indicator LBCI, and spaced below the latter there is provided a bell-shaped large bell open indicator LBOI. There is also provided on either side of the large bell open indicator a downwardly-directed large bell opening arrow indicator LBOAI and an upwardly-directed large bell closing arrow indicator LBCAI.

Referring to Fig. 2a, there is shown schematically a back view of the lower right-hand portion of the panel of Fig. 2 showing the compartmentation of the lamp enclosures mounted on the back of the panel adjacent the small bell indicators, the loads on large bell indicator and the large bell indicators. To this end, there is provided a generally rectangular enclosure 2 for the small bell lamps divided into a plurality of compartments to provide individual enclosures for the small bell position fixed lamps SBPFL, small bell closed lamps SBCL, small bell open lamps SBOL, small bell opening arrow lamps SBOA, and small bell closing arrow lamps SBCA. A similar somewhat larger enclosure 4 is provided for the large bell lamps and similarly divided into compartments. Also, a rectangular enclosure 6 divided into two compartments for the units and tens indicators is provided for the loads on large bell indicator. The enclosures and indicators may be constructed and arranged in a manner more clearly disclosed in the aforementioned copending application of Douglas W. Fath and Charles E. Smith, Serial No. 720,403, filed March 10, 1958.

Figure 3:
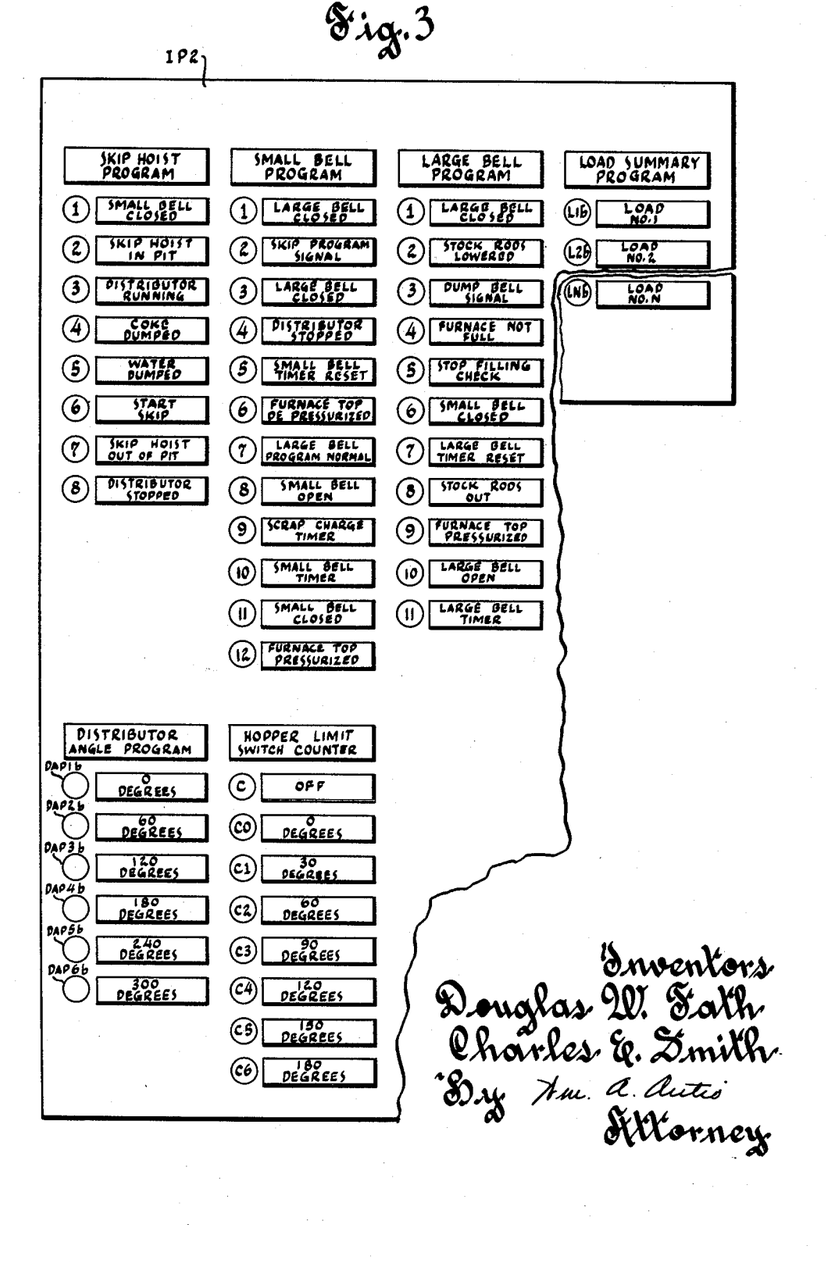
Fig. 3 shows a front view of a program indicator panel having a plurality of columns of lights, the lights in each column indicating the sequential operating positions of the corresponding control device.

Referring to Fig. 3, there are shown a plurality of groups of indicators arranged in vertical columns on indicator panel IP2 located in the hoisthouse for indicating internal operating conditions of the charging program control system. More specifically, panel IP2 is provided at its lower left-hand portion with a column of distributor angle program indicator lamps DAP1b, DAP2b, DAP3b, DAP4b, DAP5b and DAP6b respectively corresponding to and simultaneously energized as hereinafter described with the distributor position indicators angularly arranged in the upper right-hand portion of Fig. 2. Adjacent each lamp DAP1b–6b there is provided an indicia plate having legends indicative of the angle of distributor rotation in 60 degree steps exhibited by the respective indicators.

Figure 7:
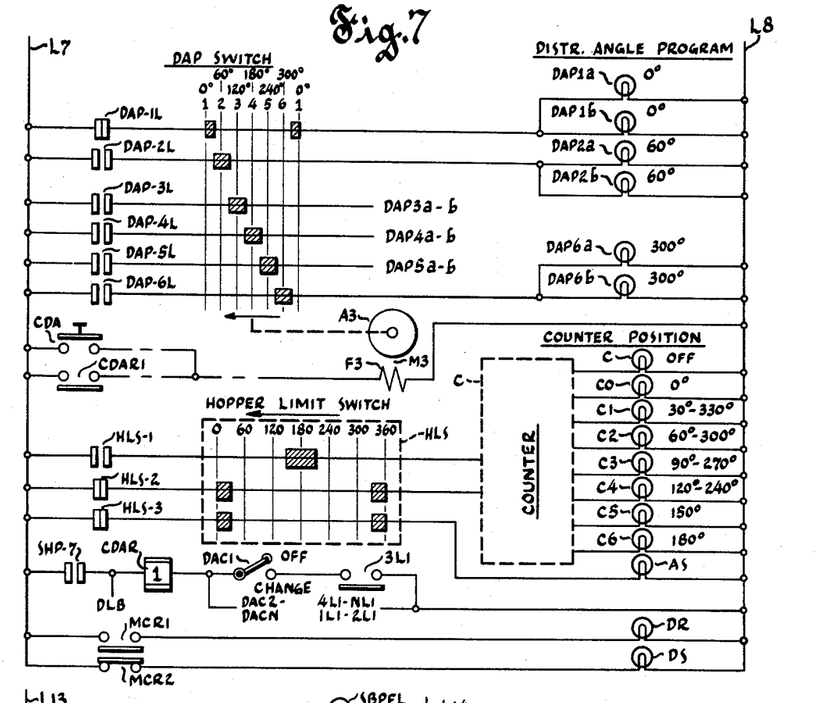
Fig. 7 shows a control network for the distributor running and stopped indicators of Fig. 2 and the distributor angle program, accurate stop light and hopper limit switch counter indicators of Fig. 3.

Directly to the right of the distributor angle program indicators, there is provided a vertical column of hopper limit switch counter indicator lamps C, C0, C1, C2, C3, C4, C5 and C6 for indicating the Off condition and the operating conditions, respectively, of the hopper limit switch counter shown in Fig. 7. Adjacent each lamp C–C6 there is provided an indicia plate having legends indicative of the Off condition (lamp C) and the angle of distributor rotation in 30 degree steps from 0 degrees (lamp C0) to 180 degrees (lamp C6) corresponding to the operating positions of the hopper limit switch counter, as hereinafter more fully described.

At the upper portion of panel IP2 there are provided four columns of program indicator lamps marked skip hoist program, small bell program, large bell program and load summary program. The skip hoist program indicator comprises eight lamps 1–8 corresponding to the eight operating positions of the skip hoist program switch, the small bell program indicator comprises twelve lamps 1–12 corresponding to the twelve operating positions of the small bell program switch, the large bell program indicator comprises eleven lamps 1–11 corresponding to the eleven operating positions of the large bell program switch, and the load summary program indicator comprises any predetermined number, for example eighteen, lamps L1b, L2b–LNb corresponding to the number of operating positions of the load summary program switch. The number of load summary program indicator lamps is equal to the number of and simultaneously energized with the next load lamps L1a, L2a–LNa in Fig. 2.

Each of the aforementioned four columns of program indicator lamps in the upper portion of Fig. 3 is provided adjacent thereto with an indicia plate having legends indicative of the operating condition of the program switch or the function having been performed in each operating position of the respective program switch. More specifically, skip hoist program lamp 1 being energized indicates that the small bell is closed, lamp 2 being energized indicates that the skip hoist is in the pit, etc. Likewise, small bell program indicator lamp 2 being energized indicates that the skip hoist program has signaled the small bell program to initiate opening of the small bell, lamp 3 being energized indicates that the large bell is closed, etc. Also, large bell program indicator lamp 3 being energized indicates that the large bell program has received a signal to initiate opening of the large bell, lamp 4 being energized indicates that the furnace has been checked and that it is not full, etc. Energization of a load summary program lamp indicates which load of the charging sequence as set up on the program selector switches of Fig. 1 is to be charged next. Thus, a separate indicator lamp having been provided for each function of the program switches and a single lamp being energized at any instant in each of the four columns of program indicators gives a ready comprehension of the precise condition of the charging controller at any instant of time.

In Figs. 4 through 10 there are shown control circuits for operating the aforementioned indicators in accordance with the operation of the charging control system.

Figure 4:
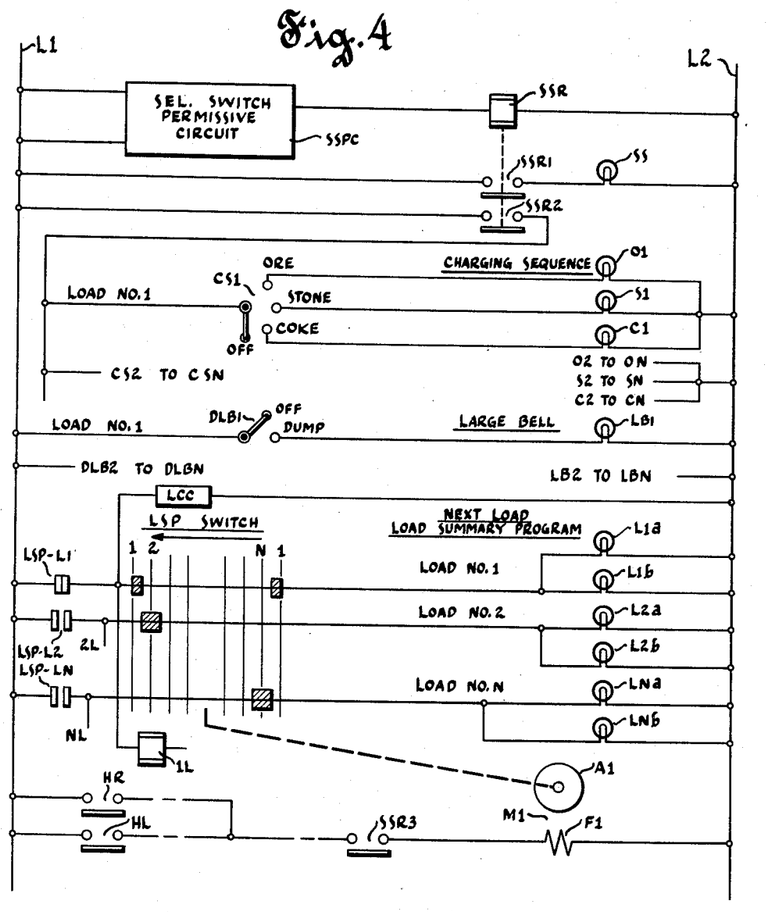
Fig. 4 shows a control network for the selector-switches-set indicator of Fig. 1, the charging sequence, load cycle counter and large bell indicators of Fig. 2, and the next load and load summary program indicators of Figs. 2 and 3.

Referring to Fig. 4, there is shown a pair of power supply lines L1 and L2 having connected in series thereacross a selector switch permissive circuit SSPC and a selector-switches-set relay SSR for energizing the latter when the charging sequence selector switches (Fig. 1) are set correctly. Relay SSR is provided with normally open contacts SSR1 for energizing lamp SS (Fig. 1), normally open contacts SSR2 for preparing energizing circuits for charging sequence indicators O1–ON, S1–SN and C1–CN (Fig. 2) through charging sequence selector switches CS1–CSN (Fig. 1), and normally open contacts SSR3 at the lower portion of Fig. 4 for preparing an energizing circuit for load summary program switch LSP drive motor M1. Relay SSR is also provided with normally open contacts SSR4 (Fig. 5), SSR5 (Fig. 8) and SSR6 (Fig. 9) hereinafter described. There is also connected across lines L1 and L2 a large bell selector switch DLB1 (Fig. 1) for energizing large bell lamp LB1 (Fig. 2) and respectively in parallel therewith large bell selector switches DLB2–DLBN for energizing large bell lamps LB2–LBN.

At the lower portion of Fig. 4, there is shown an electric motor M1 having a field winding F1 and an armature A1 for driving load summary program switch LSP, the latter being provided with operating cams and contacts LSP–L1, LSP–L2 to LSP–LN for closure in the respective operating positions thereof. Connected in series with each of the LSP switch contacts is a pair of parallel-connected indicator lamps, the first lamps L1a, L2a–LNa of each pair being the next load lamps shown on the panel in Fig. 2 and the second lamps L1b, L2b–LNb of each pair being the load summary program lamps shown on the panel in Fig. 3. Third parallel circuits through the respective LSP switch contacts control load summary relays 1L, 2L–NL for reasons hereinafter described. Connected in parallel in the energizing circuit of field winding F1 are normally open hoist right skip relay contacts HR and hoist left skip relay contacts HL for energizing motor M1 to step the LSP switch to the next operating position each time a skip load is hoisted. The aforementioned load cycle counter LCC shown in the upper left-hand portion of Fig. 2 is connected for energization through contacts LSP–L1 of the LSP switch.

Figure 5:
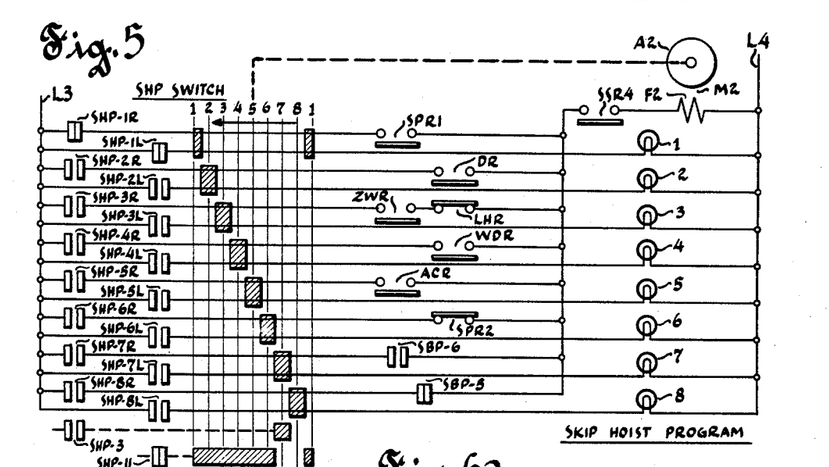
Fig. 5 shows a control network for the skip hoist program indicators of Fig. 3.

Referring to Fig. 5, there is shown a pair of power supply lines L3 and L4 and having connected thereacross a skip hoist program switch SHP provided with operating cams and running contacts SHP–1R to SHP–8R and respectively associated lamp contacts SHP–1L to SHP–8L, a running contact and its associated lamp contact being arranged for closure in each operating position of the switch. The SHP switch lamp contacts effect energization of the skip hoist program indicator lamps 1–8 also shown in Fig. 3. A drive motor M2 for the SHP switch having an armature A2 and a field winding F2 is connected for energization through the aforementioned running contacts in parallel connection, each such parallel connection also including additional control contacts hereinafter described. The SHP switch is also provided with contacts SHP–3 and SHP–11 arranged for closure in the shaded operating positions for purposes hereinafter described.

Figure 6A:
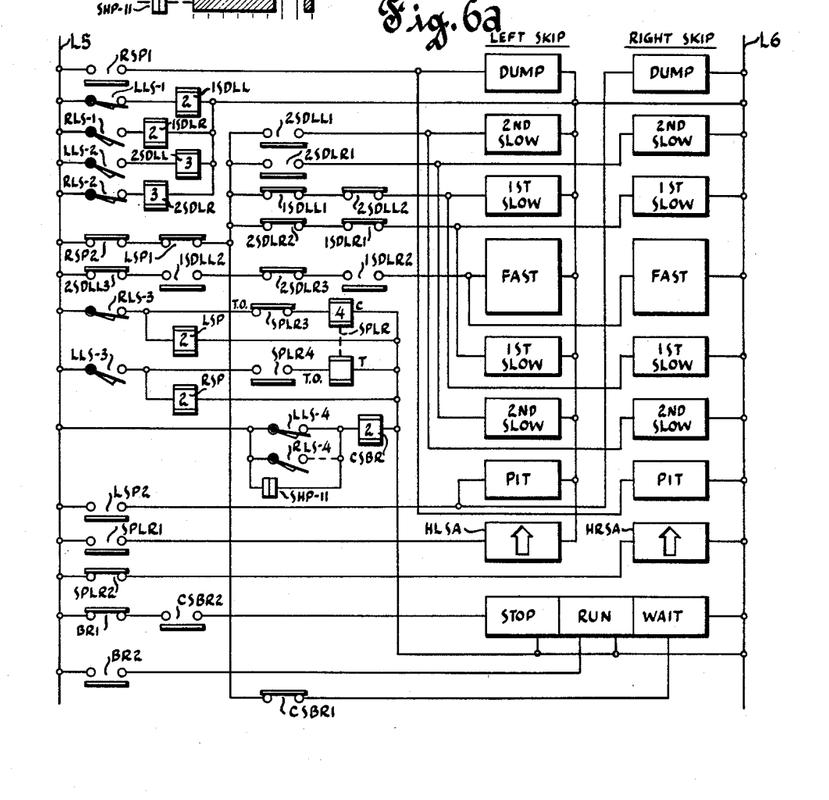
Fig. 6a shows a skip hoist indicator and control network.

Referring to Fig. 6a, there is shown a pair of power supply lines L5 and L6 and connected thereacross control circuits for operating left skip and right skip graphic indicators as well as stop, run and wait indicators for the skip hoist. At the lower right-hand portion of Fig. 6 are shown a Stop indicator for energization whenever the skip hoist is stopped, a Run indicator for energization whenever the skip hoist is running, and a Wait indicator for energization whenever a skip car is automatically stopped intermediate the ends of its travel. Directly above the aforementioned indicators there are provided two vertical columns of indicators, the left-hand column indicating travel of the left skip car and the right-hand column indicating travel of the right skip car. To this end, the left column is provided, from the bottom upwardly in that order, with a hoist left skip arrow indicator and pit, second slow, first slow, fast, first slow, second slow and dump indicators. The right-hand column is provided with a similar set of eight indicators for the right skip car. These indicators may be mounted on a hoisthouse indicator panel such as the panel shown in Fig. 2 in the arrangement shown and hereinbefore described so that movement of the indicator lights up and down corresponds to the actual movements of the left and right skip cars. A duplicate skip hoist indicator connected in parallel with that shown is normally provided in the stockhouse for indicating to the scale car operator progress of the skip cars.

The control circuit for operating the skip hoist indicators comprises a plurality of limit switches, control relays and brake contactor contacts. These include left and right skip first slowdown limit switches LLS–1 and RLS–1, left and right skip second slowdown limit switches LLS–2 and RLS–2, left and right skip-in-pit limit switches LLS–3 and RLS–3 and left and right skip check-small-bell limit switches LLS–4 and RLS–4. The control relays include left and right skip first slowdown light relays 1SDLL and 1SDLR, left and right skip second slowdown light relays 2SDLL and 2SDLR, left and right skip-in-pit relays LSP and RSP, a skip-in-pit latched relay SPLR, and a check small bell relay CSBR. Brake contactor contacts BR1 and BR2 are provided for energizing the Stop and Run indicators, respectively. The limit switches are operated in accordance with the skip hoist limit switch cam layout development shown in Fig. 6b wherein the shaded portions depict the tripped (closed) conditions of the associated limit switches and the unshaded portions depict the reset (open) conditions thereof.

Referring to Fig. 7, there are shown a pair of power supply lines L7 and L8 and connected thereacross control devices for operating distributor position indicators DAP1a, DAP2a–DAP6a (Fig. 2), distributor angle program indicators DAP1b, DAP2b–DAP6b (Fig. 3), hopper limit switch counter indicators C, C0, C1–C6 (Fig.

3), accurate stop lamp AS (Fig. 2), and distributor running and stopped indicators DR and DS (Fig. 2). To this end, there is provided a distributor angle program switch DAP having six contacts DAP–1L to DAP–6L for closure in the respective operating positions to energize the associated parallel-connected pairs of lamps DAP1a–b to DAP6a–b. There is also provided a motor M3 having an armature A3 and a field winding F3 for rotating the DAP switch in steps through its operating positions. Motor M3 is energized by a change distributor angle relay CDAR, the latter being under the control of the SBP switch contacts SBP–7 and the load summary relays of Fig. 4 in accordance with the setting of the distributor angle change selector switches shown also in Fig. 1. A pushbutton switch CDA is provided for manual control of motor M3. Contacts SBP–7 also control dump large bell contacts DLB as hereinafter described.

The control devices further include a hopper limit switch HLS driven by the distributor and having limit switches HLS–1 and HLS–2 for operating a counter C, the latter operating the counter Off and position indicators also shown in Fig. 3, and limit switch HLS–3 for energizing accurate stop lamp AS (Fig. 2). There are also provided distributor motor control relay contacts MCR1 and MCR2 for energizing distributor running and stopped indicators DR and DS, respectively, the latter also being shown in Fig. 2.

Figure 8:
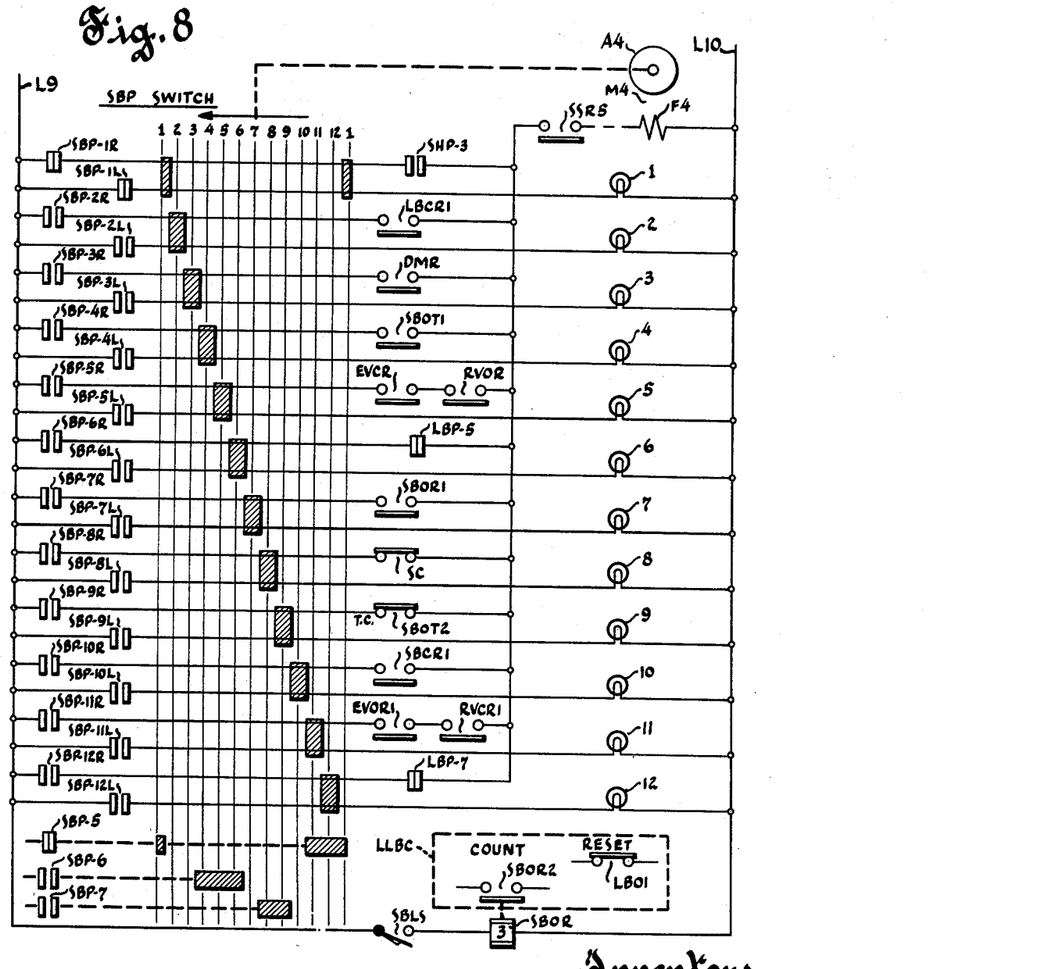
Fig. 8 shows a control network for the small bell program indicators of Fig. 3 and the loads on large bell counter indicator of Fig. 2.

Referring to Fig. 8, there are shown a pair of power supply lines L9 and L10 having connected thereacross a small bell program switch SBP provided with operating cams and running contacts SBP–1R to SBP–12R and respectively associated lamp contacts SBP–1L to SBP–12L, a running contact and its associated lamp contact being arranged for closure in each operating position of the switch. A drive motor M4 for the SBP switch having an armature A4 and a field winding F4 is connected for energization through the aforementioned running contacts in parallel connection, each such parallel connection also including additional control contacts hereinafter described. The SBP switch lamp contacts effect energization of the small bell program indicator lamps 1–12 also shown in Fig. 3. The SBP switch is also provided with contacts SBP–5 and SBP–6 for controlling the SHP switch in Fig. 5, and contacts SBP–7 also shown in Fig. 7. There is further provided a small bell open limit switch SBLS for controlling a small bell open relay SBOR to operate the loads on large bell counter LLBC also shown in Fig. 2 and the small bell indicator lamps in Fig. 10.

Figure 9:
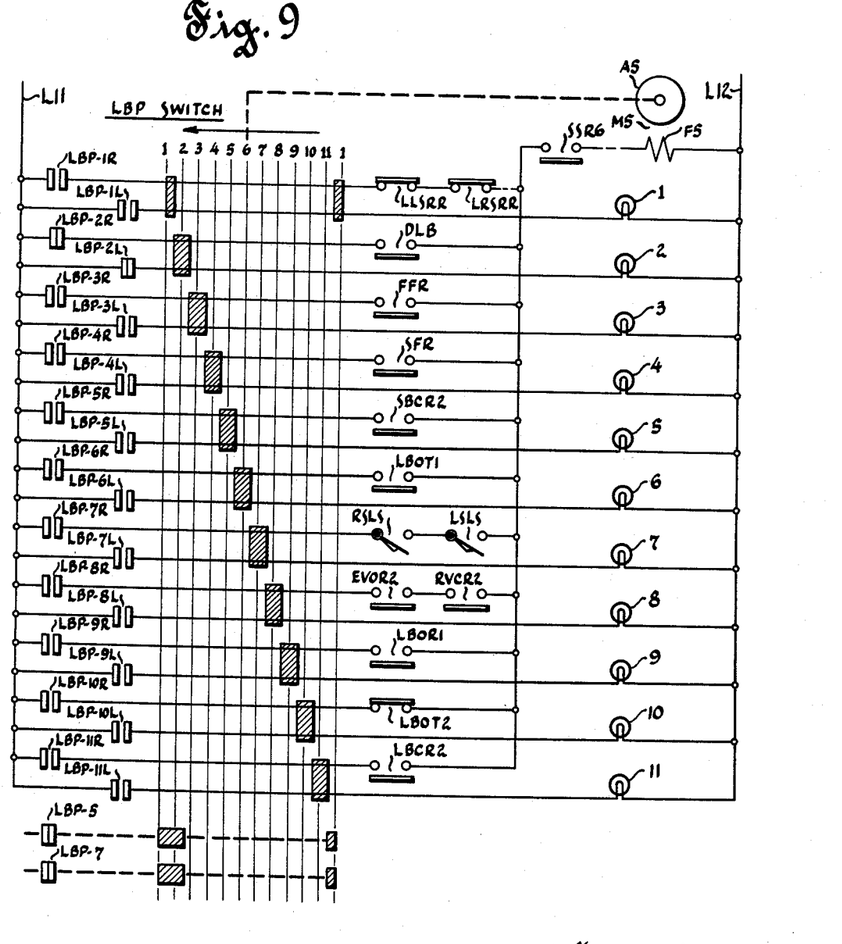
Fig. 9 shows a control network for the large bell program indicators of Fig. 3.

Referring to Fig. 9, there is shown a pair of power supply lines L11 and L12 having connected thereacross a large bell program switch LBP provided with operating cams and running contacts LBP–1R to LBP–11R and respectively associated lamp contacts LBP–1L to LBP–11L, a running contact and its associated lamp contact being arranged for closure in each operating position of the switch. A drive motor M5 for the LBP switch having an armature A5 and a field winding F5 is connected for energization through the aforementioned running contacts in parallel connection, each such parallel connection including in addition to a running contact control contacts hereinafter described. The LBP switch lamp contacts effect energization of the large bell program indicator lamps 1–11 also shown in Fig. 3. The LBP switch is also provided with contacts LBP–5 and LBP–7 for controlling the SBP switch in Fig. 8.

Figure 10:
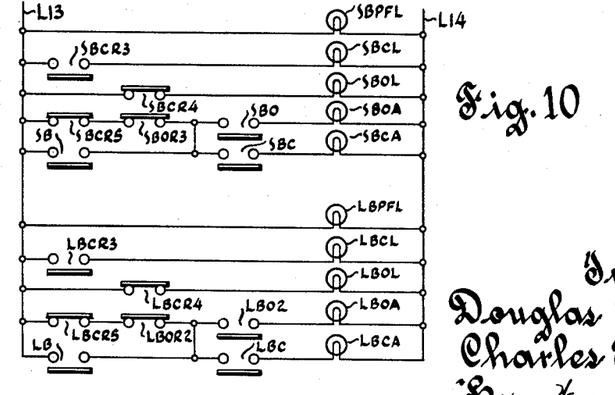
Fig. 10 shows a control network for the small bell and large bell graphic indicators in the lower right-hand portion of Fig. 2.

Referring to Fig. 10, there are shown a pair of power supply lines L13 and L14 having connected thereacross control circuits for operating the small and large bell graphic indicators shown in the lower right-hand portion of Fig. 2. Small bell position fixed lamp SBPFL and large bell position fixed lamp LBPFL are connected directly across lines L13 and L14 so that fixed indicators SBPFI and LBPFI are continuously illuminated when the control system is turned on. Small bell closed lamp SBCL is energized to illuminate indicator SBCI when the small bell is fully closed. Small bell open lamp SBOL is energized to illuminate indicator SBOI as soon as the small bell starts to open. Small bell opening arrow lamp SBOA is energized to illuminate indicator SBOAI when the small bell is opening. Small bell closing arrow lamp SBCA is energized to illuminate indicator SBCAI when the small bell is closing.

Normally open contacts SBCR3 and normally closed contacts SBCR4 and SBCR5 may be concurrently actuated by a small bell closed relay (not shown) which in turn is energized by a small bell limit switch when the small bell is fully closed. Normally closed contacts SBOR3 are actuated by small bell open relay SBOR (Fig. 8) which in turn is energized by small bell limit switch SBLS when the small bell is fully open. Normally open contacts SBO may be actuated by a small bell opening relay which in turn is energized by the SBP switch when opening of the small bell is initiated. Normally open contacts SB may be actuated by a small bell valve operator contactor which in turn is energized by the small bell opening relay. In this connection it should be noted that the small bell operator comprises a compressed air cylinder into which compressed air is admitted by a motor operated air valve to open the small bell. When the air valve is operated to exhaust the cylinder to the atmosphere, the cylinder operates by gravity to close the small bell. Normally open contacts SBC may be actuated by a small bell closing relay which in turn is energized by the SBP switch when closing of the small bell is initiated.

The large bell indicator lamps and their control circuits are similar to and operated by corresponding large bell relays in the manner hereinbefore described in connection with small bell indicator lamps.

The operation of the graphic signaling and indicating control system will now be described. Let it be assumed that power is supplied to lines L1 through L14 to energize the control circuits in Figs. 4 through 10. Let it also be assumed that the LSP switch in Fig. 4, the SHP switch in Fig. 5, the DAP switch in Fig. 7, and the SBP switch in Fig. 8 are in their No. 1 operating positions, and the LBP switch in Fig. 9 is in its operating position No. 2, these being their normal positions, and that hopper limit switch HLS in Fig. 7 is in its 0 degree position. Under these conditions the left skip car is in the charging pit and the right skip car is in its dump position over the distributor hopper.

Referring to Fig. 4, an energizing circuit is established from line L1 through contact LSP–L1 and lamps L1a and L1b in parallel to line L2 to indicate on panel IP1 in Fig. 2 that the next load to be charged is load No. 1 and to indicate on panel IP2 in Fig. 3 that the LSP switch is in its load No. 1 operating position. Relay 1L is energized in parallel with the aforementioned lamps to close contacts 1L1 in Fig. 7.

Figure 6B:
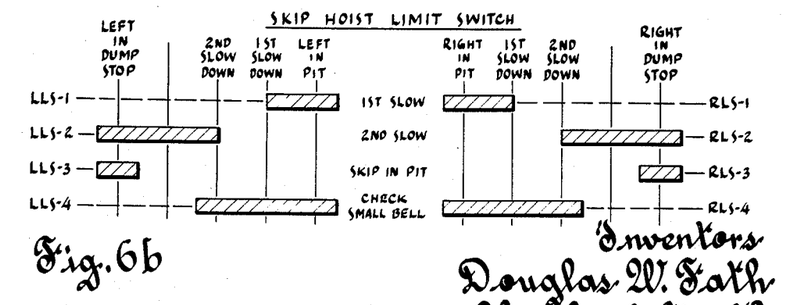
Fig. 6b shows a skip hoist limit switch.

Referring to Figs. 6a and 6b, left skip limit switches LLS–1 and LLS–4 and right skip limit switches RLS–2 and RLS–3 are tripped to their closed conditions as indicated by the shaded portions and the remaining skip hoist limit switches are open. As a result, a circuit is established across lines L5 and L6 through limit switch LLS–1 and the operating coil of relay 1SDLL to energize the latter and open contacts 1SDLL1 and close contacts 1SDLL2. A circuit is also established through limit switch RLS–2 to energize relay 2SDLR and close contacts 2SDLR1 and open contacts 2SDLR2 and 2SDLR3. Limit switch RLS–3 energizes left skip-in-pit relay LSP to open contacts LSP1 and close contacts LSP2, the latter energizing the left skip Pit indicator and the right skip Dump indicator to indicate the initial positions of the skip cars. Closing coil c of latched relay SPLR is energized through its own timed opening contacts SPLR3 in parallel with relay LSP. As a result, contacts SPLR1 effect energization of hoist left skip arrow indicator HLSA; contacts SPLR2 open and contacts SPLR4 close. After a time interval contacts SPLR3 open to deenergize closing coil $c$, relay SPLR, however, remaining latched in its closed position. Limit switch LLS-4 energizes relay CSBR to close contacts CSBR2 and open contacts CSBR1. Contacts CSBR2 complete an energizing circuit through normally closed brake relay contacts BR1 for the skip hoist Stop indicator.

In Fig. 7, lamps DAP1$a$ and DAP1$b$ are energized through the DAP switch contacts DAP-1L, the latter being closed in operating position 1 of the distributor angle program switch. The setting of the DAP switch determines the angle to which the distributor is rotated following dumping of each skip load in the distributor hopper. Thus, in operating position 1, the DAP switch calls for zero degree rotation. Lamp DAP1$a$ illuminates the corresponding distributor position indicator in Fig. 2. Hopper limit switch HLS-3 energizes lamp AS to illuminate the corresponding accurate stop indicator in Fig. 2, to indicate that the distributor is accurately stopped at its zero degree position. Distributor motor control contacts MCR2 energize distributor stopped lamp DS also shown in Fig. 2. In Fig. 8 small bell program lamp 1 is energized through contacts SBP-1L, and in Fig. 9 large bell program lamp 2 is energized through contacts LBP-2L.

In Fig. 10, the small and large bell position fixed lamps SBPFL and LBPFL are energized across lines L13 and L14 to continuously illuminate the corresponding indicators in Fig. 2. The small and large bells being closed, contacts SBCR3 and LBCR3 are closed to energize lamps SBCL and LBCL and illuminate small and large bell closed indicators SBCI and LBCI in Fig. 2, thus to provide a graphic indication of the closed condition of the bells. Contacts SBCR4 and LBCR4 are open to extinguish lamps SBOL and LBOL and the corresponding bell open indicators SBOI and LBOI. Contacts SBCR5 and LBCR5 also are open and the remaining contacts in Fig. 10 are in the positions shown.

The control system is now ready for preselection of the charging program. Let it be assumed that large bell selector switch DLB1 (Figs. 1 and 4) is set in its Dump position and that the remaining large bell selector switches DLB2–DLBN are left in their Off positions. As a result, indicator LB1 in Fig. 2 is illuminated to indicate that a large bell dump is preselected to occur after the first skip load of the charging sequence has been deposited on the large bell. Let it further be assumed that charging sequence selector switch CS1 (Figs. 1 and 4) is set in its Coke position, CS2 in its Stone position and the remaining charging sequence selector switches including switch CSN are left in their Off positions. The charging sequence selector switches are provided with additional pairs of contact sets connected in a selector switch permissive circuit SSPC, schematically shown in Fig. 4, so that, if the charging sequence selector switches are set correctly, that is, each consecutive selector switch being set in accordance with the charging sequence and the remaining selector switches being turned to their Off positions, relays SSR is energized. As a result, contacts SSR1 close to energize lamp SS and the corresponding indicator in Fig. 1 to indicate the correct setting of the charging sequence selector switches. Contacts SSR2 close to complete an energizing circuit through selector switch CS1 to energize lamp C1. Similarly, lamp S1 is energized through switch CS2, and the corresponding indicators are illuminated in Fig. 2 to indicate what material is to be charged in each load of the charging sequence. Contacts SSR3 at the lower portion of Fig. 4 close to prepare an energizing circuit for the LSP switch drive motor M1, and contacts SSR4, SSR5 and SSR6 in Figs. 5, 8 and 9 close to prepare energizing circuits for the SHP switch, the SBP switch and the LBP switch drive motors, respectively. For a detailed disclosure of selector switch permissive circuit SSPC reference may be had to the aforementioned Douglas W. Fath and Charles E. Smith copending application Serial No. 720,400, filed March 10, 1958.

Let it also be assumed that distributor angle change selector switch DAC1 (Figs. 1 and 7) is set in its change position and that the remaining switches DAC2–DACN are left in their Off positions. As a result, switch DAC1 prepares an energizing circuit for change distributor angle relay CDAR in Fig. 7 to be completed when contacts SBP-7 close as hereinafter described. The purpose of contacts SBP-7 is to delay energization of relay CDAR until load No. 1 has been rotated.

The control system is now ready to initiate charging of the furnace. To this end, the SHP switch in Fig. 5 controls operation of the skip hoist. As the SHP switch rotates through its operating positions as hereinafter described, it will be apparent that lamps 1–8 are sequentially energized by contacts SHP-1L and SHP-8L, only one of these lamps being energized at any given time to afford an indication on panel IP2 in Fig. 3 of the progress of the skip hoist program. Skip-in-pit relay contacts SPR1 are closed, for example, by relays LSP and RSP (Fig. 6$a$), whenever a skip car is in the pit. The left skip car being in the pit, contacts SPR1 effect energization of field winding F2 through contacts SHP-1R and SSR4 to drive the SHP switch to operating position 2. As a result, contacts SHP-1R and SHP-1L open and contacts SHP-2R and SHP-2L close and lamp 2 is energized. As shown on the name plate in Fig. 3, illumination of skip hoist program indicator 2 indicates that a skip car is in the pit. When the distributor has started, distributor run relay contacts DR complete a circuit through contacts SHP-2R to drive the SHP switch to operating position 3. Thus, indicator 3 in Fig. 3 shows that the distributor is running as depicted on the name plate adjacent indicator 3. Contacts DR are normally shunted by distributor stop relay contacts (not shown) to effect driving of the SHP to operating position 3 when zero degree distributor rotation has been preselected which does not require running of the distributor.

When coke has been discharged into the left skip car, zero weight relay contacts ZWR and coke hopper gate relay contacts LHR are closed to complete a circuit through contacts SHP-3R to drive the SHP switch to operating position 4. When water has been dumped into the skip car if water has been preselected for load No. 1, water dumped relay contacts WDR close to drive the SHP switch to operating position 5. If water has not been scheduled, automatic water relay contacts (not shown) shunt contacts WDR.

The skip hoist control is arranged to start the skip hoist automatically on coke loads and to require manual starting control on stone or ore loads. Since coke has been preselected for load No. 1, automatic coke relay contacts ACR are closed to effect driving of the SHP switch to operating position 6 thereby to start the skip hoist and to hoist the loaded left skip car out of the charging pit. For a disclosure of the relays and operating networks effecting stepping of the SHP switch as well as the SBP switch in Fig. 8, the LBP switch in Fig. 9, the small bell and large bell signaling control contacts in Fig. 10, and contacts HR and HL in the lower left-hand portion of Fig. 4 reference may be had to the aforementioned Douglas W. Fath and Charles E. Smith copending application Serial No. 720,400, filed March 10, 1958. When the left skip car leaves the charging pit, skip-in-pit relay contacts SPR2 close to effect rotation of the SHP switch to operating position 7. Referring to Fig. 3, it will be apparent that during operation of the SHP switch thus far, lamp 4 indicated that coke was dumped into the skip car, lamp 5 indicated that water was dumped if scheduled, lamp 6 indicated starting of the skip hoist, and lamp 7 now indicates that the skip car is out of the pit. The SHP switch stops in operating position 7 to await operation of the small bell to drop any material previously deposited thereon onto the large bell. In operating position 7, the SHP switch closes contacts SHP-3 (also shown in Fig. 8) to drive the SBP switch to operating position 2.

In operating position 2, the SBP switch ignites small bell program lamp 2 to indicate, as shown on the name plate in Fig. 3, that the skip program signal (closure of contacts SHP-3) has been received. The large bell being closed, large bell closing relay contacts LBCR1 are closed; the distributor being stopped, distributor stop relay contacts DMR are closed; the small open timer having been energized, contacts SBOT1 are closed; the equalizer valve having closed and the relief valve having opened, contacts EVCR and RVOR are closed; and the LBP switch being in operating position 2 this being the normal waiting position of the LBP switch between large bell dumps, contacts LBP-5 are closed. Thus, the SBP switch rotates from operating position 2 to operating position 7, lighting lamps 3–7 momentarily to indicate completion of the aforementioned functions as seen by the name plates adjacent lamps 3–7 in Fig. 3.

Rotation of the SBP switch to operating position 4 as hereinbefore described also effects closure of contacts SBP-6 (also shown in Fig. 5) to drive the SHP switch to operating position 8 when the distributor has stopped. Contacts SBP-5 having opened when the SBP switch left operating position 1, the former stop the SHP switch in operating position 8 to await closure of the small bell. The SHP switch being in operating position 8, the skip hoist is stopped short of reaching its dump position if the small bell is open as hereinafter described.

Rotation of the SBP switch to operating position 7 initiates opening of the small bell and effects closure in Fig. 10 of small bell opening relay contacts SBO and small bell valve operator contactor contacts SB to energize lamp SBOA and illuminate small bell opening arrow indicator SBOI in Fig. 2. This arrow is directed downwardly to indicate that the small bell is moving down to drop a skip load on the large bell. When the small bell starts to open, small bell closing relay contacts SBCR3 open to extinguish small bell closed indicator SBCI and contacts SBCR4 and SBCR5 close. Contacts SBCR4 illuminate small bell open indicator SBOI and contacts SBCR5 complete a maintaining circuit in shunt of contacts SB to maintain energization of lamp SBOA. This shunt circuit is necessary as contacts SB open when the small bell valve operator has opened the cylinder valve to admit compressed air for opening the small bell. When the small bell is fully open, limit switch SBLS in Fig. 8 closes to energize small bell open relay SBOR. Contacts SBOR3 open to extinguish lamp SBOA. Thus, fixed indicators SBPFI and open indicator SBOI are now illuminated to graphically indicate the open condition of the small bell. Relay SBOR also closes contacts SBOR1 to drive the SBP switch to operating position 8 and closes contacts SBOR2 in loads on large bell counter LLBC to count the load dropped on the large bell and to give an indication thereof on the panel in Fig. 2.

In operating position 8, the SBP switch closes contacts SBP-7 (also shown in Fig. 7) in the energizing circuit of change distributor angle relay CDAR. Although switch DAC1 is closed to its Change operating position, the circuit is not completed at this time as load summary relay 3L contacts 3L1 are open and only contacts 1L1 are closed on the first load. It will be apparent from Fig. 7 that the load summary relay contacts are displaced by two relative to the distributor angle change selector switches, the third relay contact 3L1 being in circuit with the first selector switch DAC1, in order to delay the distributor angle change preselected for load No. 1 until the first load has been rotated. To this end, relay CDAR does not energize to change the distributor angle until load No. 2 has been dispatched from the stockhouse.

A scrap charge not having been scheduled, scrap charge relay contacts SC in Fig. 8 are closed, thereby driving the SBP switch to operating position 9. When the small bell open timer times out, timed closing contacts SBOT2 close to drive the SBP switch to operating position 10 thereby to initiate closing of the small bell and to indicate the same. To this end, small bell closing relay contacts SBC and small bell valve operator contactor contacts SB in Fig. 10 close to effect illumination of small bell closing arrow indicator SBCAI. When the small bell starts to close, limit switch SBLS in Fig. 8 opens to deenergize relay SBOR and close contacts SBOR3 in Fig. 10 thereby to maintain lamp SBCA energized after contacts SB open. When the small bell is fully closed, contacts SBCR5 open to extinguish the small bell closing arrow SBCAI, contacts SBCR3 close to illuminate small bell closed indicator SBCI, contacts SBCR4 open to extinguish small bell open indicator SBOI, and contacts SBCR1 in Fig. 8 close to drive the SBP switch to operating position 11.

Going back to the operation of the skip hoist, when the skip hoist is energized, hoist left skip relay contacts HL in Fig. 4 close to energize field winding F1 of motor M1 thereby to drive the LSP switch to operating position 2. The apparatus which limits operation of the LSP switch to the next operating position on each closure of contacts HL or HR is omitted herefrom to avoid complicating the drawings. For a disclosure thereof, reference may be had to the aforementioned Douglas W. Fath and Charles E. Smith copending application Serial No. 720,400, filed March 10, 1958. In operating position 2, the LSP switch energizes load summary relay 2L to close contacts 2L1 without effect at this time. The LSP switch also energizes lamp L2a (Fig. 2) to indicate that load No. 2 is the next load to be charged and energizes lamp L2b in Fig. 3 to indicate the operating position of the LSP switch. Energization of the skip hoist also effects opening of brake relay contacts BR1 to extinguish the Stop indicator and closure of contacts BR2 to energize the Run indicator.

Referring to Figs. 6a and 6b, when the left skip car leaves the pit and the right skip car leaves its dump position, limit switch RLS-3 opens to interrupt energization of left skip-in-pit relay LSP. Contacts LSP1 complete energizing circuits through contacts RSP2 and 2SDLR1 for the left skip bottom and right skip top 2nd Slow indicators, and contacts LSP2 interrupt the energizing circuits to the left skip Pit and right skip Dump indicators, thus to indicate that the left skip car has left the charging pit and the right skip car has left its dump position.

As the loaded left skip accelerates and continues on its way to the furnace top, limit switch RLS-4 closes without effect and limit switch RLS-2 opens to interrupt energization of relay 2SPLR. Contacts 2SDLR1 interrupt energization of the aforementioned second Slow indicators and contacts 2SDLR2 complete energizing circuits through contacts RSP2, LSP1 and 1SDLR1 for the left skip bottom and right skip top first Slow indicators. Thereafter, limit switch RLS-1 closes to effect energization of relay 1SDLR. Contacts 1SDLR1 interrupt energization of the aforementioned first Slow indicators and contacts 1SDLR2 complete energizing circuits through contacts 2SDLL3, 1SDLL2 and 2SDLR3 for the left skip and right skip Fast indicators. When the left skip car reaches its first slowdown position, limit switch LLS-1 opens to interrupt energization of relay 1SDLL. Contacts 1SDLL1 complete energizing circuits through contacts RSP2, LSP1 and 2SDLL2 for left skip top and right skip bottom first Slow indicators, and contacts 1SDLL2 interrupt the Fast indicators. When the left skip car reaches its second slowdown position, limit switch LLS-2 closes to effect energization of relay 2SDLL. Contacts 2SDLL1 effect energization of left skip top and right skip bottom second Slow indicators, and contacts 2SDLL2 interrupt energization of the first Slow indicators.

At this time a small bell check is made to determine that the small bell has completed its cycle of operation and closed before allowing the loaded left skip car to enter its dump position. To this end, limit switch LLS-4 opens. Referring to Fig. 5, it will be apparent that contact SHP-11 opened when the SHP switch was driven to operating position 7. Thereafter contact SBP-6 closed to drive the SHP switch to operating position 8, contact SHP-11 remaining open. However, the SHP switch cannot be driven to operating position 1 and thus to close contacts SHP-11 until the small bell has closed permitting closure of contact SBP-5. Therefore, if the small bell is open, opening of limit switch LLS-4 interrupts energization of check small bell relay CSBR to stop the skip hoist. Relay CSBR also closes contacts CSBR1 (Fig. 6a) to effect energization of the skip hoist Wait indicator, and opens contacts CSBR2 to prevent energization of the Stop indicator when contacts BR1 close. When the skip hoist is stopped, brake contactor contacts BR1 close and contacts BR2 open, the latter interrupting energization of the Run indicator. When the small bell closes to effect rotation of the SBP switch to operating position 11 as hereinbefore described, contacts SBP-5 close to drive the SHP switch to operating position 1. As a result, contacts SHP-11 close to reenergize relay CSBR thereby to restart the skip hoist. Contacts CSBR1 interrupt energization of the Wait indicator and contacts BR2 energize the Run indicator. When the left skip reaches its dump position and dumps the load in the distributor hopper, limit switch LLS-3 closes to effect energization of right skip-in-pit relay RSP. Relay RSP closes contacts RSP1 to energize the left skip Dump and right skip Pit indicators, and opens contacts RSP2 to interrupt energization of the left skip top and right skip bottom second Slow indicators. A circuit is also established through limit switch LLS-3 and contacts SPLR4 for tripping coil T of relay SPLR. As a result, contacts SPLR1 interrupt energization of hoist left skip arrow HLSA, contacts SPLR2 energize hoist right skip arrow HRSA, contacts SPLR3 prepare an energizing circuit for closing coil c, and after a time interval contacts SPLR4 interrupt energization of tripping coil T, relay SPLR, however, remaining latched in its normal position shown.

In operating position 11, the SBP switch, in addition to closing of contacts SBP-5 as hereinbefore described, effects closure of the relief valve and opening of the equalizer valve to pressurize the furnace top. As a result, contacts RVCR1 and EVOR1 in Fig. 8 close to drive the SBP switch to operating position 12. Pressurizing of the furnace top is indicated on panel IP2 in Fig. 3 by energization of indicator lamp 12. In this position, the SBP switch is interlocked with the LBP switch to prevent another small bell dumping cycle unless the LBP switch is in its normal position. The LBP switch being in its normal position 2, contacts LBP-7 are closed and the SBP switch is driven to operating position 1. The condition of the large bell program switch is indicated by illumination of the small bell program lamp 1 in Fig. 3.

It will be recalled that large bell selector switch DLB1 was set in its Dump position and distributor angle change selector switch DAC1 was set in its Change position. The left skip car having been operated to hoist the first load to the distributor hopper as hereinbefore described, the right skip car is operated in a similar manner to hoist the second load of stone to the distributor hopper. When the skip hoist is operated to hoist the right skip car, hoist right skip contacts HR in Fig. 4 close to drive the LSP switch to operating position 3. As a result, load summary relay contacts 3L1 in Fig. 7 close to partially complete the energizating circuit for relay CDAR. Now, when the SBP switch operates to drop the second load on the large bell, contacts SBP-7 effect energization of change distributor angle relay CDAR through contacts DAC1 and 3L1. Contacts CDAR1 close an energizing circuit for field winding F3 of the DAP switch motor M3 to drive the DAP switch to operating position 2. Alternatively, the DAP switch may be driven through its operating positions by closure of manual switch CDA. In operating position 2, indicator DAP2a (Fig. 2) is energized to indicate the new 60 degree rotation angle of the distributor and lamp DAP2b (Fig. 3) is energized to indicate the degrees of rotation the DAP switch is calling for. Thus, the distributor angle change preselected for load No. 1 is effected after load No. 1 has been deposited on the large bell. Each time the distributor is rotated, distributor motor control contacts MCR1 energize distributor running lamp DR and contacts MCR2 extinguish distributor stopped lamp DS.

Contacts SBP-7 (Fig. 7) also complete an energizing circuit to dump large bell apparatus through contacts similar to load summary contacts 3L1 and a contact set of selector switch DLB1, the latter not being shown, to effect closure of contacts DLB in Fig. 9. Closure of contacts DLB constitutes a signal from the load summary program to dump the large bell and drives the LBP switch to operating position 3. Illumination of large bell program indicator lamp 3 indicates in Fig. 3 that the dump large bell signal has been received. If the furnace is not full, stop filling has not been initiated, the small bell is closed and the large bell open timer has been energized, contacts FFR, SFR, SBCR2 and LBOT1 are closed whereby the LBP switch is driven to operating position 7. When the LBP switch leaves operating position 2, contacts LBP-5 and LBP-7 (Fig. 8) are opened to prevent opening of the small bell during the large bell operating cycle. When the LBP switch reaches operating position 4, the stockrods are hoisted effecting closure of right stockrod limit switch RSLS and left stockrod limit switch LSLS. Closure of these limit switches drives the LBP switch to operating position 8. The equalizer valve being open and the relief valve closed, contacts EVOR2 and RVCR2 are closed and the LBP switch rotates to operating position 9, therein to initiate opening of the large bell. When the large bell opens, contacts LBOR1 close and when the large bell open timer times out, contacts LBOT2 close to drive the LBP switch to operating position 11 and effect closure of the large bell. When the large bell is fully closed, contacts LBCR2 effect energization of field winding F5 of motor M5 to drive the LBP switch to operating position 1. In this position the stockrods are again lowered to measure the charge and lowering contacts LLSRR and LRSRR close to drive the LBP switch to its normal position 2. The various functions which effect driving of the large bell program switch through its operating positions are indicated on the name plates adjacent lamps 1–11 in Fig. 3 and the completion of each function is indicated by energization of the associated indicator lamp in each operating position of the LBP switch.

An essential feature of the invention resides in the arrangement and configuration of the indicators in Fig. 2 simulating the operating elements of a blast furnace and giving a ready comprehension of operation of the latter. The charging program indicators in the left-hand portion of Fig. 2 simultaneously provide indications of the large bell program, the charging sequence and the next load to be charged. In addition, the program indicators in Fig. 3 are arranged so that an indication is provided for each step of each constituent program operation. Should the charging control system stop due to a faulty condition, the single energized lamp in each program indicator column will show the position of each program switch thereby to restrict the possible failure to a small area and facilitate location of the trouble. Also, an indication is provided in Fig. 6a or left and right skip car operation simulating the movements of the skip cars from the charging pit to their dump positions.

We claim:

1. In a graphic signaling system for a blast furnace of the type having a rotary distributor, a small bell, a large bell and a pair of skip cars for conveying charging materials from a charging pit to a distributor hopper, in combination, an indicator panel having mounted thereon selector devices for preselecting a charging program, indicator devices on said panel for visually indicating said charging program when said selector devices are set, additional indicator devices on said panel providing graphic representations of the distributor and the small bell and the large bell, means responsive to charging of the blast furnace in accordance with said preselected program for energizing the last mentioned indicator devices to graphically indicate the distributor rotation angle and the opening and closure of the small and large bells.

2. The invention defined in claim 1, wherein said additional indicator devices are arranged on said panel in the same order as the actual furnace elements graphically exhibited thereby.

3. The invention defined in claim 1, together with load summary program control and indicating means respectively associated with said charging program indicator devices and responsive to hoisting of each skip load for indicating the program functions preselected for the next load.

4. The invention defined in claim 2, together with loads on large bell indicator device mounted on said panel between said small bell and said large bell indicator devices, and means responsive to each opening of the small bell for operating the last mentioned indicator device to provide a numerical indication of the number of skip loads accumulated on the large bell.

5. The invention defined in claim 1, together with load summary program control means progressively responsive to charging of each skip load of the preselected charging program, load cycle indicator means, and means responsive to each cycle of operation of said load summary program control means for operating said load cycle indicator means to indicate the total number of charging cycles.

6. The invention defined in claim 1, together with further indicator devices on said panel for indicating skip car operations, said further indicator devices being arranged on said panel in the directions of skip car movement, and means responsive to operation of the skip cars for sequentially and momentarily energizing said further indicator devices to exhibit said skip car movement.

7. In a graphic signaling and indicating system for a blast furnace of the type having a rotary distributor, a small bell, a large bell and left and right skip cars for conveying charging materials from a charging pit to a distributor hopper, in combination, an indicator panel having mounted thereon a group of presettable devices for selecting a plural skip load charging sequence of ore and stone and coke, visual indicators on said panel for continuously indicating the material preselected for each load of the charging sequence when said presettable devices are set, and next load indicator devices respectively associated with said charging sequence indicators and responsive to hoisting of each skip load for indicating the charging material preselected for the next load of the charging sequence.

8. The invention defined in claim 7, together with an indicator lamp on said panel for indicating a correct setting of said presettable devices, said correct setting being a setting of each consecutive presettable device in an ore or stone or coke designating position in accordance with a desired charging program and a setting of the remaining presettable devices in their Off positions, and control means responsive to said correct setting of said presettable devices for energizing said indicator lamp.

9. The invention defined in claim 7, together with distributor angle program control and indicating means comprising a distributor angle program switch for controlling distributor rotation in accordance with the setting thereof, graphic indicating means on said panel for exhibiting a rotary distributor, said graphic indicating means having indicator devices arranged at predetermined incremental angles corresponding to distributor rotation angles, and means responsive to said program switch for energizing one of said indicator devices in accordance with the setting of said program switch.

10. The invention defined in claim 9, together with an accurate stop lamp on said panel associated with said graphic indicating means, and control means responsive to rotation of said distributor to a given one of said incremental angles for energizing said accurate stop lamp.

11. The invention defined in claim 10, together with skip hoist program control and indicating means comprising a skip hoist program switch for controlling skip car operation, two vertical columns of skip car indicators for indicating the operating conditions of the associated left and right skip cars, and means responsive to operation of the skip cars under the control of said skip hoist program switch for energizing said skip car indicators sequentially in opposite directions to exhibit skip car operation.

12. The invention defined in claim 11, together with small bell program control and indicating means comprising a small bell program switch for controlling opening and closing of the small bell, graphic indicators on said panel for exhibiting the open and closed conditions of the small bell and the direction of movement thereof, means responsive to said skip hoist program switch for initiating operation of said small bell program switch to control operation of the small bell, and means responsive to operation of said small bell program switch and the small bell for energizing said graphic indicators to exhibit the direction of movement and condition of the small bell.

13. The invention defined in claim 7, together with a group of presettable devices on said panel for selecting a large bell dump for a given load of the charging sequence, large bell dump indicators on said panel associated with said charging sequence and next load indicators continuously energized in accordance with the setting of said large bell dump presettable devices, load summary program control means for counting the skip loads hoisted to the distributor hopper, large bell program control and indicating means comprising a large bell program switch for controlling opening and closing of the large bell, graphic indicators on said panel for exhibiting the open and closed conditions of the large bell and the direction of travel thereof, means responsive to said load summary program control means when said given load has been deposited on the large bell for initiating operation of said large bell program switch to control operation of the large bell, and means responsive to operation of said large bell program switch and the large bell for energizing said graphic indicators to exhibit the direction of movement and condition of the large bell.

14. In a graphic signaling and indicating system for a blast furnace of the type having a small bell for receiving skip loads of charging material and for dropping each such skip load for accumulation on a large bell whereafter the large bell is lowered to discharge the material into the furnace, in combination, an indicator panel having mounted thereon graphic indicators having substantially small bell and large bell configurations and energizable to exhibit the open and closed conditions of the bells, directional indicators for indicating the directions of movement of the bells, said indicators being arranged on said panel in vertical relation substantially corresponding to the actual physical relation of the bells on the furnace, continuously energized indicators graphically exhibiting with the bell-closed indicators material receptacles, and means responsive to operation of the bells for energizing said indicators to exhibit the directions of travel and conditions of the bells.

15. The invention defined in claim 14, together with indicator means mounted on said panel affording an indication of the total number of skip loads accumulated on the large bell between opening operations of the large bell, and means responsive to each opening of the small bell for operating said indicator means.

16. In a graphic signaling and indicating control system for a blast furnace of the type having skip hoist program control means for controlling operation of a skip hoist to convey charging material to the furnace top, small bell program control means for controlling operation of a small bell to drop each skip load onto a large bell, large bell program control means for controlling operation of the large bell to discharge a plurality of skip loads accumulated thereon into the furnace, and load summary program control means for controlling charging of the furnace in accordance with a preselected charging program, the improvement comprising an indicator panel having mounted thereon three vertical groups of indicator lamps respectively indicating the operating positions of the skip hoist and small bell and large bell program control means, a fourth vertical group of indicator lamps including one lamp for each skip load of the charging sequence, indicia plates mounted adjacent the lamps in said three groups indicating the program control functions having been performed in each position of the skip hoist and small bell and large bell program control means, means responsive to operation of the skip hoist and small bell and large bell program control means for sequentially energizing said indicator lamps in each of said three respective groups, there being only one lamp energized in each of said three groups at a given instant of time, and means responsive to the load summary program control means for sequentially energizing the lamps in said fourth group to indicate progress of the charging sequence, the horizontal row of lamps in said four groups energized at a given instant of time indicating the precise operation position of the control system.

17. In a graphic signaling and indicating system for a blast furnace of the type having a rotary distributor hopper closed by a small bell for receiving skip loads of charging material and for rotating each skip load of material deposited therein to predetermined angles whereafter the small bell is lowered to drop each skip load of such material onto a large bell in a desired distribution, an indicator panel having mounted thereon a graphic indicator for exhibiting a rotary distributor, said graphic indicator having indicator devices arranged at predetermined incremental angles corresponding to distributor rotation angles, a distributor angle program switch for controlling distributor rotation in accordance with the setting thereof, and means responsive to said program switch for illuminating one of said indicator devices in accordance with the setting of said program switch to indicate the angle to which the distributor is to be rotated.

18. The invention defined in claim 17, together with an accurate stop lamp mounted on said panel centrally of said indicator devices, and switch means responsive to stopping of said distributor at any one of said rotation angles for illuminating said accurate stop lamp.

19. The invention defined in claim 17, together with an accurate stop lamp mounted on said panel centrally of said indicator devices, a hopper limit switch for illuminating said lamp at the end of each revolution thereof, and said hopper limit switch being driven by said distributor hopper to rotate one revolution for each incremental angular rotation of said distributor hopper whereby a given number of momentary illuminations of said accurate stop lamp is indicative of an amount of distributor rotation proportional to the sum of a corresponding number of said incremental angles.

References Cited in the file of this patent

UNITED STATES PATENTS 2,773,610  Mohr et al. ___________ Dec. 11, 1956